No. 686,390. Patented Nov. 12, 1901.
J. M. COX.
SCREW COUPLING.
(Application filed Apr. 2, 1901.)
(No Model.)
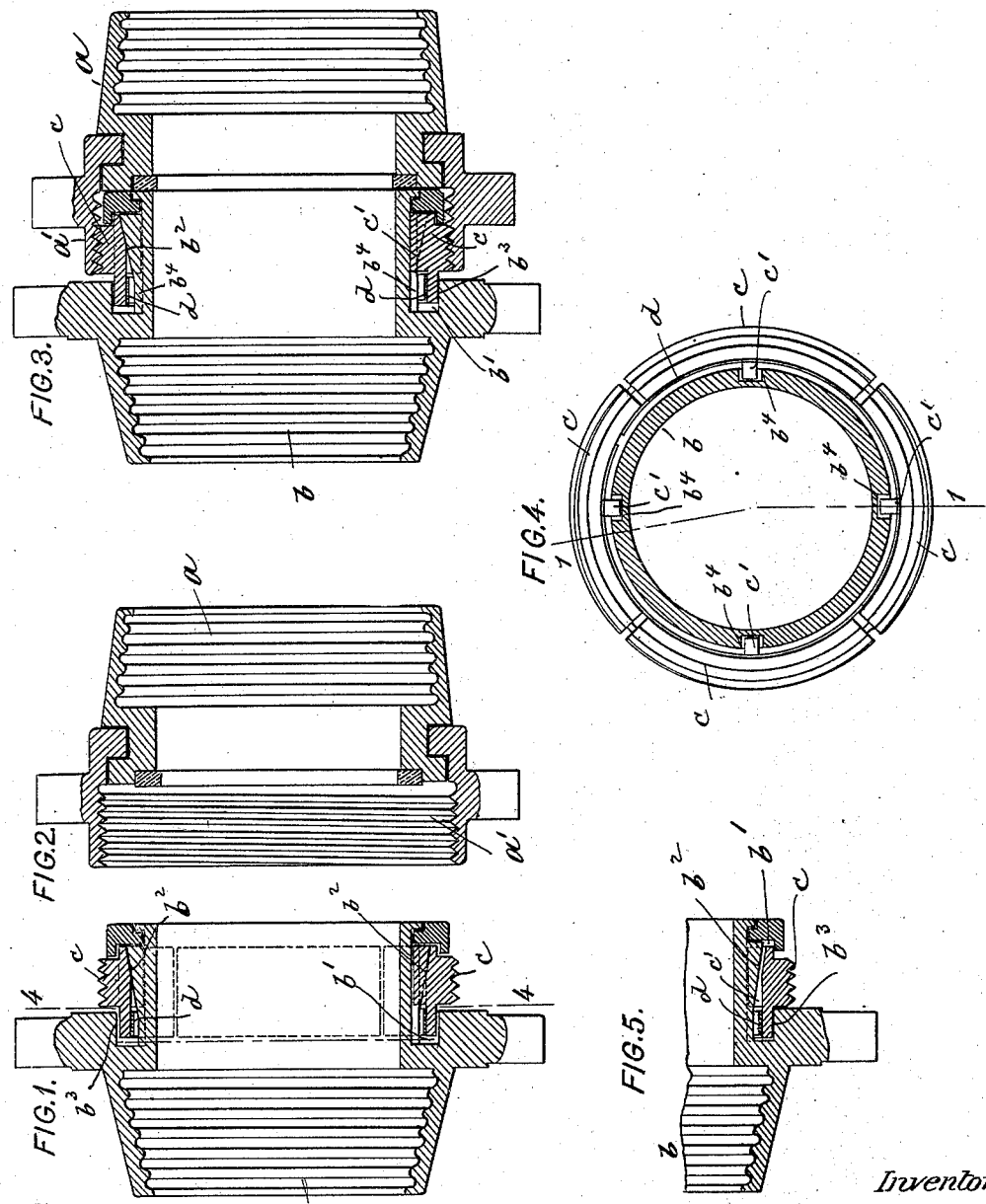
Witnesses:
John Becker.
Edward Ray
Inventor:
James M. Cox
by his attorneys
Roeder & Brieven
THE NORRIS PETERS CO., PHOTO-LITHO., WASHINGTON, D. C.

UNITED STATES PATENT OFFICE.

JAMES M. COX, OF NEW YORK, N. Y., ASSIGNOR TO UNITED STATES COUPLER AND MANUFACTURING COMPANY, OF EAST ORANGE, NEW JERSEY, A CORPORATION OF NEW JERSEY.

SCREW-COUPLING.

SPECIFICATION forming part of Letters Patent No. 686,390, dated November 12, 1901.

Application filed April 2, 1901. Serial No. 54,034. (No model.)

*To all whom it may concern:*

Be it known that I, JAMES M. COX, a citizen of the United States, and a resident of New York city, county and State of New York, have invented certain new and useful Improvements in Screw-Couplings, of which the following is a specification.

This invention relates to a screw-coupling in which the screw or male member is composed of expansible sections which are adapted to be thrust axially into the nut or female section. After a preliminary coupling has in this way been effected the sectional male member of the coupling is expanded radially outward by a rotation of the nut, so that the parts of the coupling will become firmly interlocked.

In the accompanying drawings, Figure 1 is a longitudinal section on line 1 1, Fig. 4, of the male member of a hose-coupling embodying my invention. Fig. 2 is a longitudinal section of the female member. Fig. 3 is a section through the coupling, showing it closed; Fig. 4, a cross-section on line 4 4, Fig. 1; and Fig. 5, a section through the rim of the male section, showing the parts in a different position.

The letters $a$ and $b$ represent the two members of a coupling, to which the hose or nozzle is adapted to be attached in suitable manner.

The female member $a$ is provided with a rotatable nut $a'$, which is adapted to embrace and engage the thread of the male member $b$. In case the member $a$ is used to unite a nozzle to a hose the nut $a'$ need not be rotatable, because in that case the entire member $a$, carrying the nozzle, may be rotated.

The male member $b$ of the coupling is provided with an outwardly-opening circumferential recess $b'$, having a beveled base $b^2$. Within the recess $b'$ there is contained the expansible male member of the coupling. This male member or screw consists of a number of curved sections $c$, having an outer threaded face and an inner face, which is preferably beveled to coöperate with the beveled base $b^2$. The sections $c$ are slightly shorter than the height of the recess $b'$, so that such sections have a slight lateral play within the recess. A feather $c'$ on each of the screw-sections $c$ engages a keyway $b^4$ of member $b$, and thus holds the sections against radial displacement, though permitting axial movement. A spring $d$ serves to normally force the nut-sections $c$ outward and against the flange $b^3$ of recess $b'$.

When the screw-sections $c$ of the male member are thrust into the nut $a'$ of the female member, the screw-sections $c$ will be pushed toward the left, Fig. 5—i. e., away from the free end of member $b$. If now the nut $a'$ is rotated, it will draw the screw-sections $c$ toward the right, Fig. 1, and along the beveled surface $b^2$ of recess $b'$. This will cause such sections to be expanded radially outward and into the threads of the nut $a'$, so that the members of the coupling will become securely interlocked and will not part even under excessive strain.

Though the invention has been shown to be embodied in a hose-coupling, it is evident that it may be applied to other implements and tools in which an expanding nut is employed.

What I claim is—

1. In a screw-coupling, a male member having a beveled recess, a sectional screw movable within said recess, and a spring, combined with a nut adapted to embrace the sectional screw, substantially as specified.

2. In a screw-coupling, a male member having a beveled recess and keyways, a sectional screw having feathers to engage said keyways, and a spring, combined with a nut adapted to embrace the sectional screw, substantially as specified.

Signed by me at New York city, county and State of New York, this 1st day of April, 1901.

JAMES M. COX.

Witnesses:
 WILLIAM SCHULZ,
 F. V. BRIESEN.